United States Patent
Nicolai (10) Patent No.: US 8,083,005 B1
(45) Date of Patent: Dec. 27, 2011

(54) LAND LEVELING DEVICE

(76) Inventor: Troy D. Nicolai, Mankato, MN (US)

( * ) Notice: Subject to any disclaimer, the term of this patent is extended or adjusted under 35 U.S.C. 154(b) by 0 days.

(21) Appl. No.: 12/648,355

(22) Filed: Dec. 29, 2009

(51) Int. Cl.
*A01B 35/20* (2006.01)
(52) U.S. Cl. .................. 172/393; 172/459; 172/779
(58) Field of Classification Search .......... 172/393, 172/445.1, 612, 684.5, 779, 788, 459; 404/118
See application file for complete search history.

(56) References Cited

U.S. PATENT DOCUMENTS

| | | | | |
|---|---|---|---|---|
| 1,303,415 | A * | 5/1919 | Thurston | 361/38 |
| 1,851,064 | A * | 3/1932 | Reifschneider | 172/393 |
| 2,014,479 | A | 9/1935 | Martin | |
| 2,503,638 | A | 4/1950 | Shuey | |
| 2,880,528 | A | 4/1959 | Lusk | |
| 3,276,153 | A * | 10/1966 | Sorensen | 172/387 |
| 3,798,701 | A * | 3/1974 | Irwin et al. | 15/235.8 |
| 4,082,150 | A | 4/1978 | Winkles | |
| 4,155,316 | A * | 5/1979 | Bailey et al. | 111/66 |
| 4,189,009 | A * | 2/1980 | Welch | 172/799.5 |
| 4,236,586 | A | 12/1980 | Shader et al. | |
| 4,320,988 | A * | 3/1982 | Seal | 404/118 |
| 4,337,833 | A * | 7/1982 | Welch | 172/445.1 |
| 4,572,301 | A * | 2/1986 | Bourgeois, Jr. | 172/445.1 |
| 4,585,075 | A * | 4/1986 | Mork | 172/197 |
| 4,655,297 | A * | 4/1987 | Bourgeois, Jr. | 172/445.1 |
| 4,892,155 | A * | 1/1990 | Wanamaker | 172/199 |
| 4,892,437 | A * | 1/1990 | Kraft | 404/97 |
| 5,024,280 | A * | 6/1991 | Mork | 172/197 |
| 5,191,943 | A * | 3/1993 | Minor et al. | 172/393 |
| 5,332,331 | A * | 7/1994 | Critz et al. | 404/96 |
| 5,397,200 | A * | 3/1995 | Seal | 404/118 |
| 5,511,625 | A * | 4/1996 | Mork | 172/445.1 |
| 5,771,980 | A * | 6/1998 | Mork | 172/501 |
| 6,000,476 | A | 12/1999 | Gall | |
| 6,283,225 | B1 | 9/2001 | Hermonson | |
| 7,273,111 | B2 * | 9/2007 | Johnson | 172/684.5 |
| 7,407,339 | B2 * | 8/2008 | Halonen et al. | 404/118 |
| 2009/0092444 | A1 * | 4/2009 | Schoen | 404/118 |

* cited by examiner

*Primary Examiner* — Robert Pezzuto
*Assistant Examiner* — Jamie L McGowan
(74) *Attorney, Agent, or Firm* — Neustel Law Offices (57) ABSTRACT

A land leveling device for leveling uneven surfaces. The land leveling device generally includes a frame adapted to be removably attached to a tractor. The frame will generally include a rear support, a first side support extending in a forward direction from a first end of the rear support and a second side support extending parallel to the first side support from a second end of the rear support. A central rod will preferably extend forward from a central point on the rear support parallel to and between the first side support and second side support. A pair of leveling members are each fixedly attached to the side supports at their respective ends and pivotally attached to the central rod. As the land leveling device passes over terrain, the leveling members automatically pivot about the central rod to adjust for uneven surfaces.

9 Claims, 9 Drawing Sheets

LAND LEVELING DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a land leveler and more specifically it relates to a land leveling device for leveling uneven surfaces.

2. Description of the Related Art

Any discussion of the related art throughout the specification should in no way be considered as an admission that such related art is widely known or forms part of common general knowledge in the field.

Land levelers have been in use for years to clear roads, create paths and create level surfaces. Land levelers are generally utilized to sift dirt and remove debris while smoothing out any area over which they pass. Land levelers come in a variety of forms, ranging from hand-operable tools to attachments for tractors.

Traditional land levels have generally included leveling surfaces and structures which are fixed and incapable of pivoting with respect to the ground. Such a configuration has been known to result in the leveling surface digging into the ground when the land leveler passes over uneven surfaces. The inability to pivot often requires the operator of the land levelers to make continuous passes over uneven horizontal surfaces to accomplish proper leveling for various applications.

Because of the inherent problems with the related art, there is a need for a new and improved land leveling device adapted to level areas on which the ground is not on a flat plane.

BRIEF SUMMARY OF THE INVENTION

A system for leveling uneven surfaces. The invention generally relates to a land leveling device which includes a frame adapted to be removably attached to a tractor. The frame will generally include a rear support, a first side support extending in a forward direction from a first end of the rear support and a second side support extending parallel to the first side support from a second end of the rear support. A central rod will preferably extend forward from a central point on the rear support parallel to and between the first side support and second side support. A pair of leveling members are each attached to the side supports at their respective ends and pivotally attached to the central rod, such that the leveling members pivot about the central rod to adjust for uneven terrain.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 8 illustrate a land leveling device 10, which comprises a frame 20 adapted to be removably attached to a tractor 12. The frame 20 will generally include a rear support 21, a first side support 30 extending in a forward direction from a first end 22 of the rear support 21 and a second side support 36 extending parallel to the first side support 30 from a second end 23 of the rear support 21. A central rod 50 will preferably extend forward from a central point on the rear support 21 parallel to and between the first side support 30 and second side support 36. A pair of leveling members 60, 65 are each rotatably attached to the side supports 30, 36 at their respective ends and pivotally attached to the central rod 50, such that the leveling members 60, 65 pivot about the central rod 50 to adjust for uneven terrain.

B. Frame.

Figure 4:
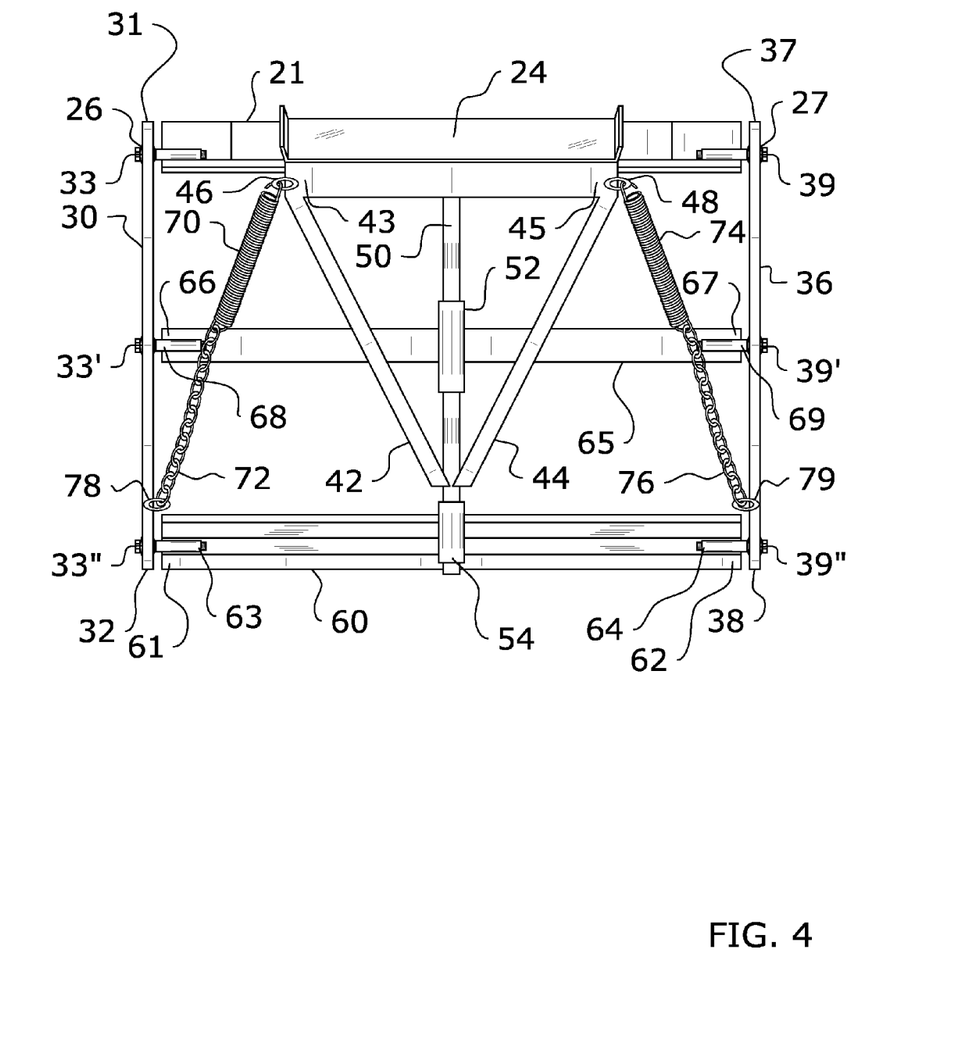
FIG. 4 is a top view of the present invention.
Figure 5:
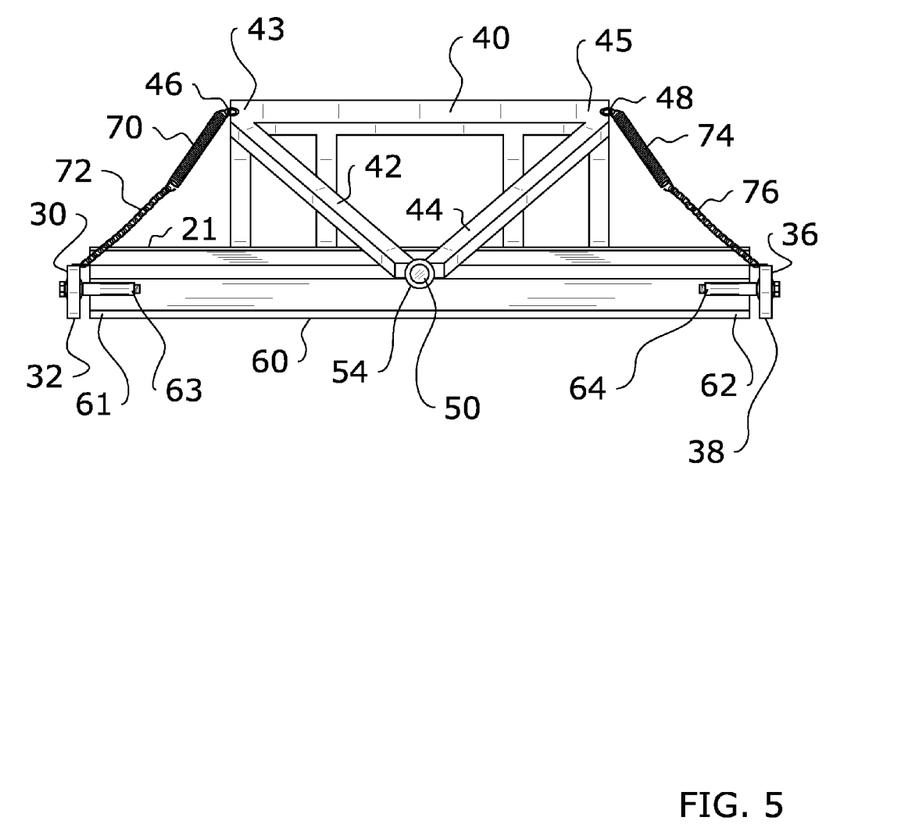
FIG. 5 is a front view of the present invention.

The present invention will generally include a frame 20 which is removably attachable to the lift member 14 of a tractor 12 or other motor vehicle. The frame 20 will generally be comprised of a rear support 21, a first side support 30 and a second side support 36 as shown in FIG. 4.

The rear support 21 of the present invention will generally be comprised of an elongated member which extends perpendicularly with respect to the first side support 30 and second side support 36. The rear support 21 may be comprised of various materials and configurations, but will preferably be comprised of a metal material which is capable of withstanding exposure to wet conditions without rusting, cracking, warping or bending.

Figure 1:
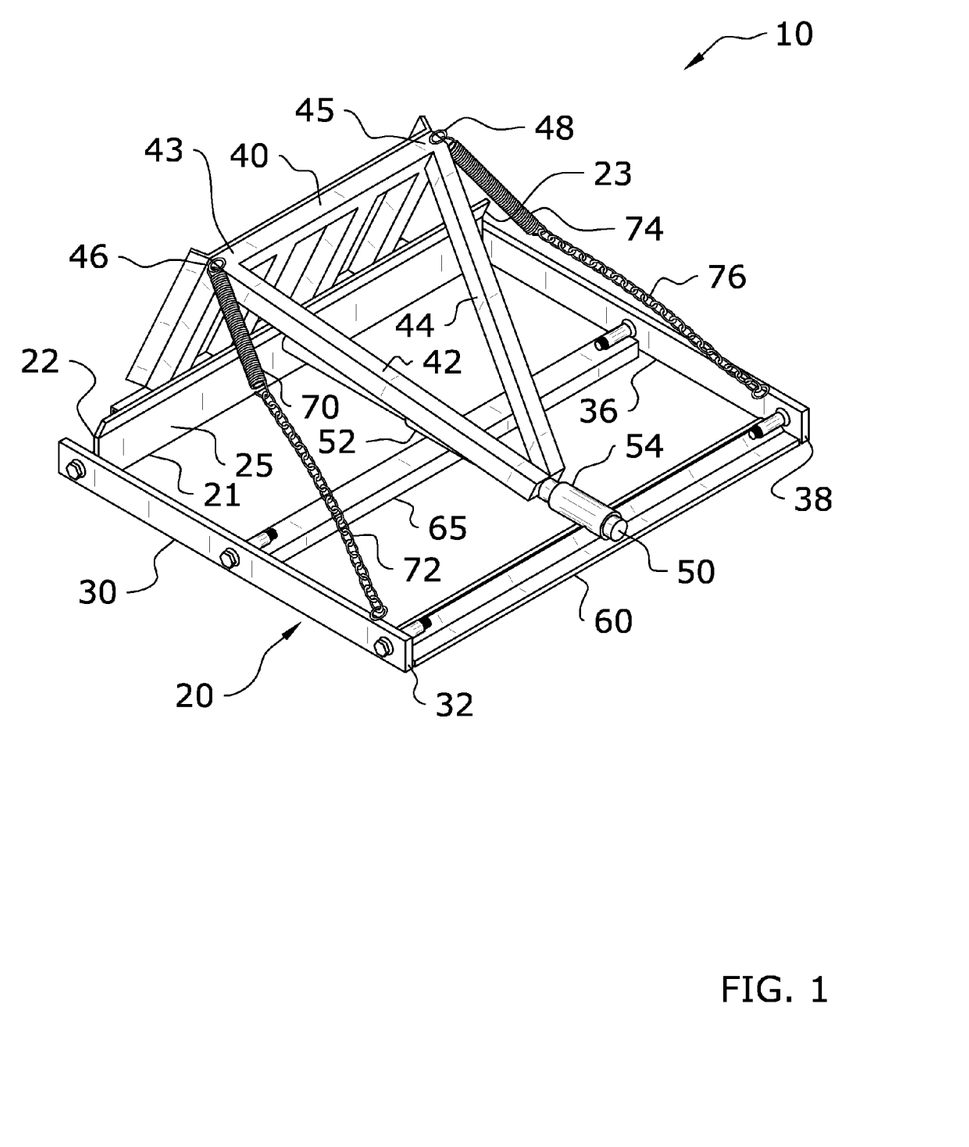
FIG. 1 is an upper perspective view of the present invention.
Figure 2:
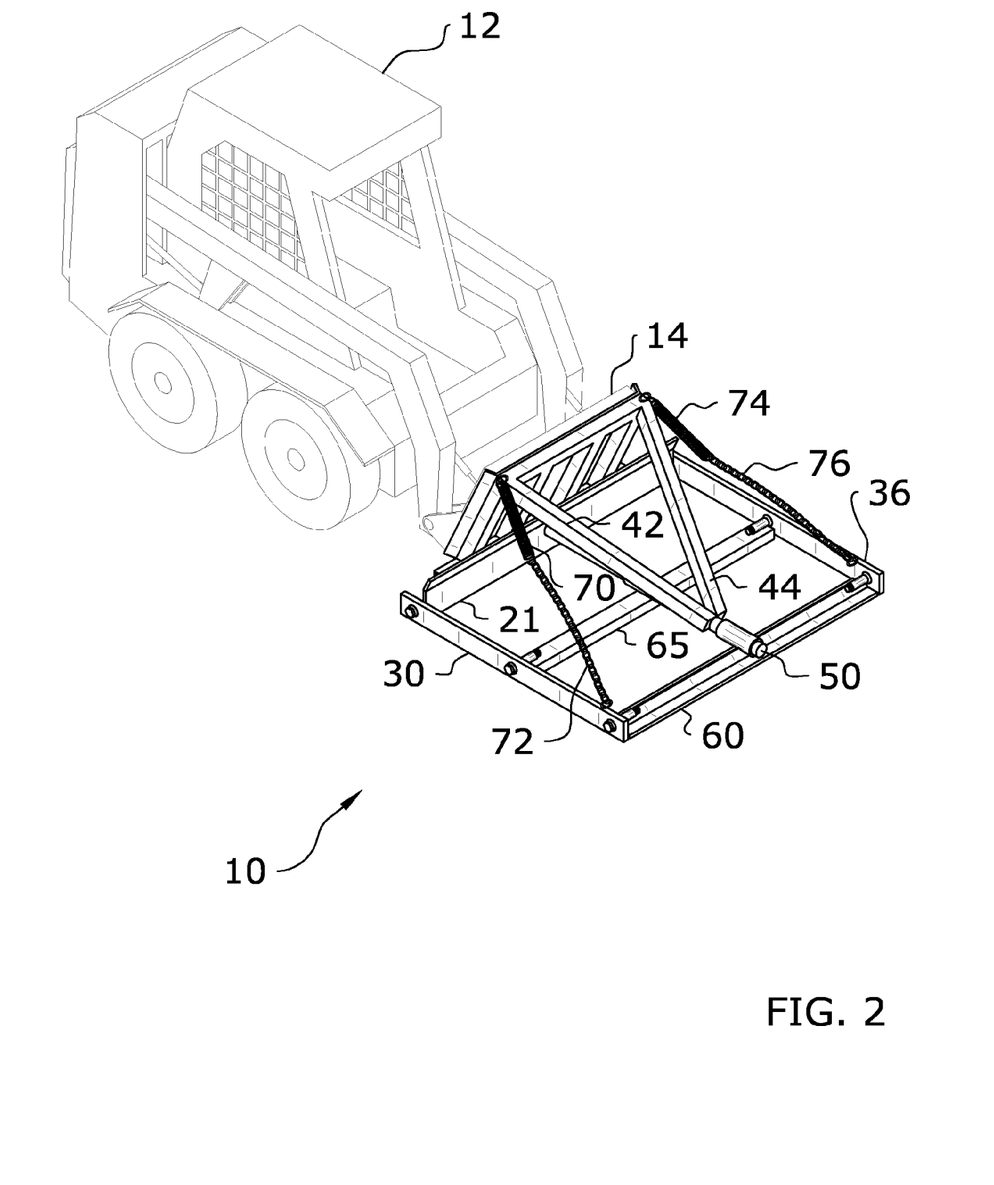
FIG. 2 is an upper perspective view of the present invention attached to a tractor.

In a preferred embodiment as shown in FIG. 1, the rear support 21 of the frame 20 will be comprised of an elongated, L-shaped member which includes a vertical portion 25 and a horizontal portion 24. The vertical portion 25 of the rear support 21 will preferably face in the forward direction, with the horizontal portion 24 extending perpendicularly in a backward direction from the lower end of the vertical portion 25. The rear support 21 includes a first end 22 and a second end 23, wherein the first end 22 is rotatably connected to the first side support 30 and the second end 23 is rotatably connected to the second side support 36.

The first side support 30 of the present invention will generally be comprised of an elongated member which extends perpendicularly with respect to the rear support 21 of the frame 20. The first side support 30 may be comprised of various materials and configurations, but will preferably be comprised of a metal material which is capable of withstanding exposure to wet conditions without rusting, cracking, warping or bending. The first side support 30 includes a first end 31 and a second end 32, wherein the first end 31 of the first side support 30 will preferably be rotatably connected to the first end 22 of the rear support 21 and the second end 32 of the first side support 30 will preferably be rotatably connected to the first end 61 of the first leveling member 60 of the present invention.

The second side support 36 of the frame 20 will generally be comprised of an elongated member extending perpendicularly with respect to the rear support 21. The second side support 36 will preferably be of substantially the same design and material of the first side support 30. The second side support 36 will preferably be rotatably connected to the second end 23 of the rear support 21, opposite of the first side support 30. In a preferred embodiment, the first end 37 of the second side support 36 will be rotatably connected to the second end 23 of the rear support and the second end 38 of the second side support 36 will be rotatably connected to the second end 62 of the first leveling member 60 of the present invention.

The first side support 30 of the present invention will generally include one or more apertures 33 through which one or more joints 26, 63, 68 may be extended to create a rotatable connection between the first side support 30 and the rear support 21, the first leveling member 60 and/or the second leveling member 65. In a preferred embodiment as shown in FIG. 1, a first aperture 33 will be positioned adjacent the first end 31 of the first side support 30, a second aperture 33' will be positioned at a point between the first end 31 and second end 32 of the first side support 30 and a third aperture 33" will be positioned adjacent the second end 32 of the first side support 30.

The second side support 36 of the frame 20 similarly will also generally include one or more apertures 39 for supporting the joints 27, 64, 69 to create a rotatable connection between the second side support 36 and the rear support 21, the first leveling member 60 and/or the second leveling member 65. In a preferred embodiment, the second side support 36 will include a first aperture 39 adjacent its first end 37, a second aperture 39' at a position between its first end 37 and its second end 38 and a third aperture 39" adjacent its second end 38 as shown in FIG. 1.

The rear support 21 of the frame 20 will generally be rotatably connected to the first side support 30 and second side support 36 by a first joint 26 and a second joint 27. The joints 26, 27 of the present invention may be comprised of any joint, socket or other structure which allows a rotating connection between the side supports 30, 36 and the rear support 21 such that the side supports 30, 36 rotate with respect to the rear support 21.

Figure 3A:
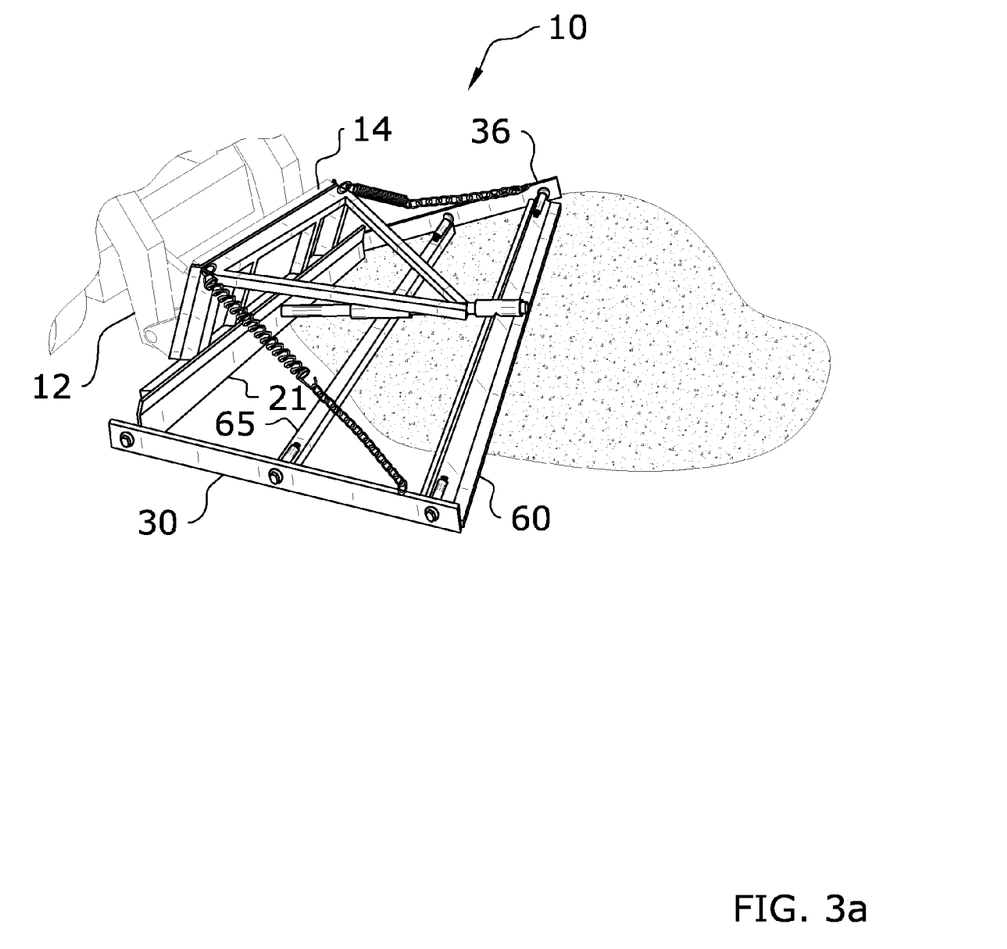
FIG. 3a is an upper perspective view of the present invention in use.
Figure 3B:
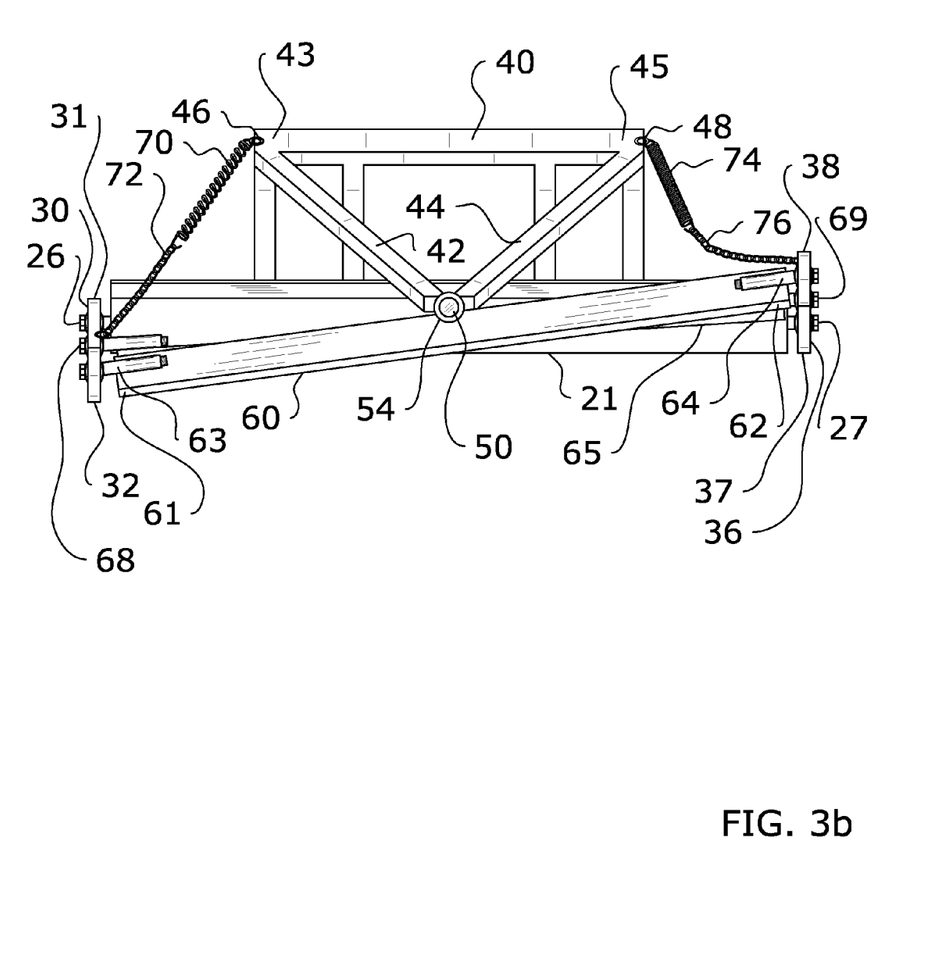
FIG. 3b is a front view of the present invention in use.
Figure 6:
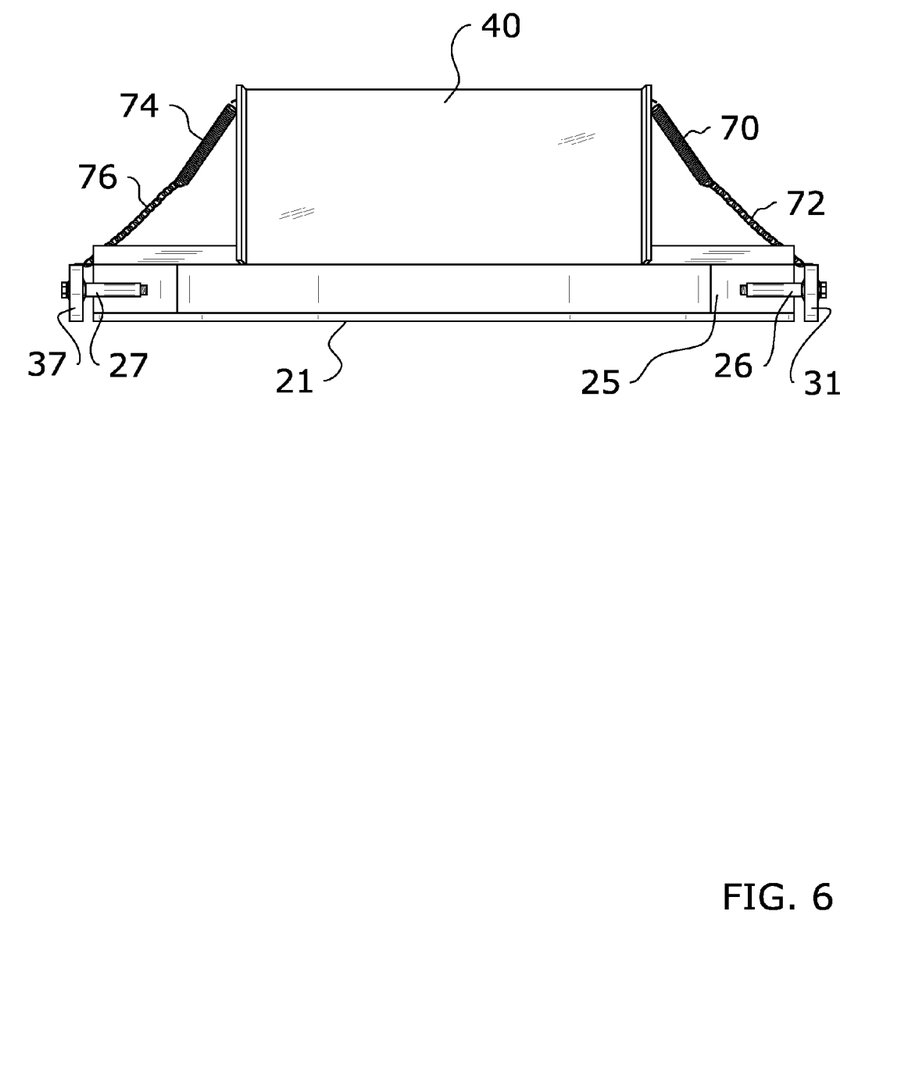
FIG. 6 is a rear view of the present invention.
Figure 7:
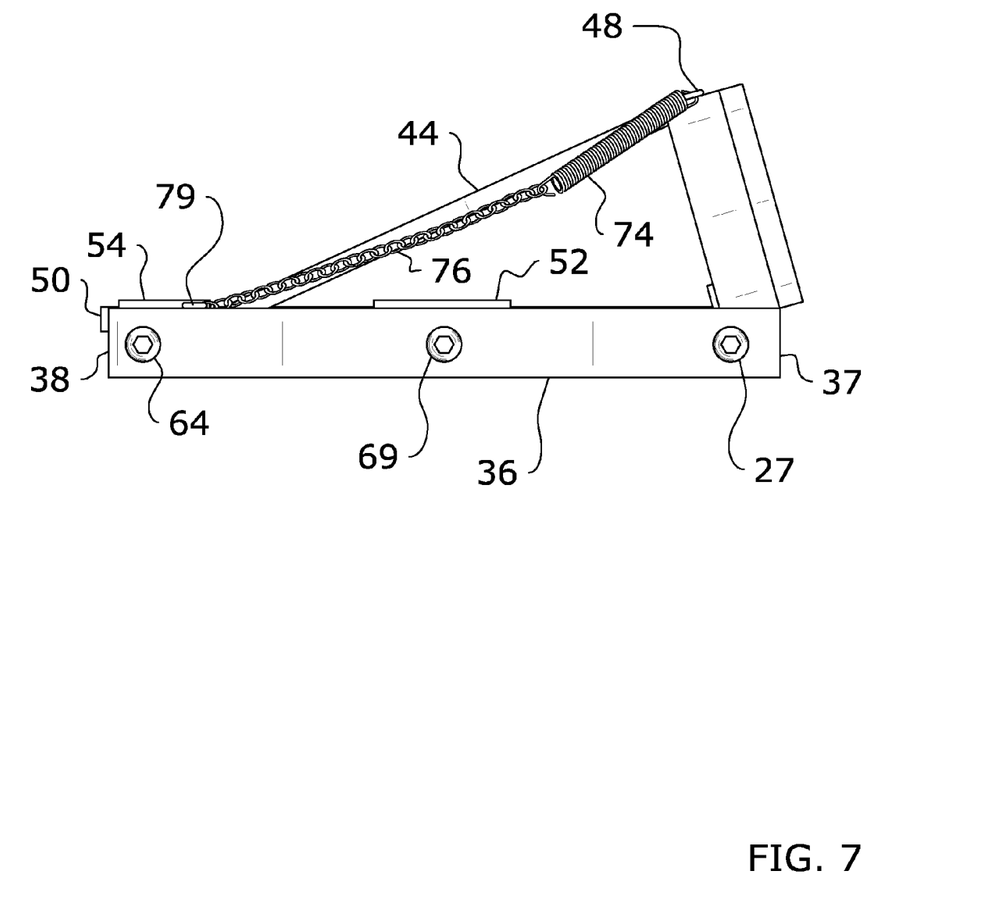
FIG. 7 is a first side view of the present invention.
Figure 8:
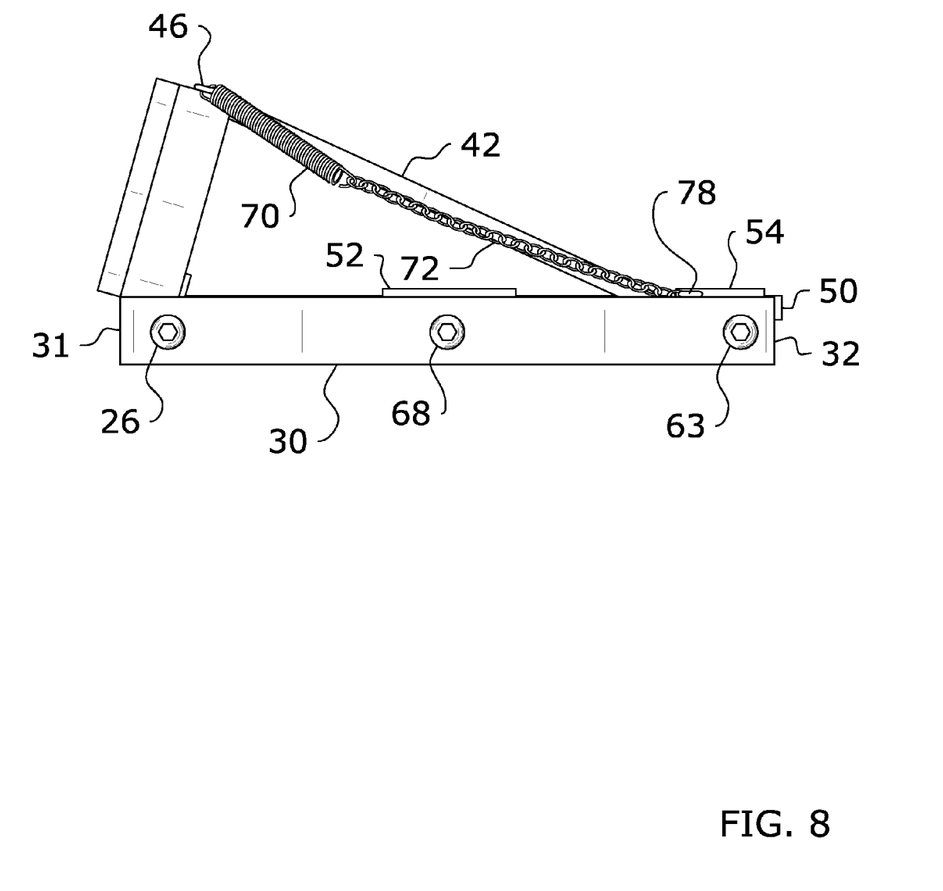
FIG. 8 is a second side view of the present invention.

In a preferred embodiment, a first joint 26 comprised of a ball joint will extend through an aperture 33 adjacent the first end 31 of the first side support 30 and be fixedly attached to the first end 22 of the rear support 21 as shown in FIG. 3a. In such an embodiment, it is also preferable to include a second joint 27 comprised of a ball joint extending through an aperture 39 adjacent the first end 37 of the second side support 36 and fixedly attached to the second end 23 of the rear support 21. It is also preferable that the joints 26, 27 be fixedly attached to the vertical portion 25 of the rear support 21 as shown in FIG. 6.

C. Mount Assembly.

The present invention will also generally include a mount assembly 40 for allowing the land leveling device 10 to be removably connected to the lift member 14 of a tractor 12 or other vehicle. The mount assembly 40 may be comprised of various configurations known in the art which allow an attachment to be removably secured to a vehicle such as a tractor 12.

The mount assembly 40 will preferably be connected to the rear support 21 of the frame 20 and, in some embodiments. It is also appreciated that, in some embodiments, the rear support 21 may be integrally formed with the mount assembly 40 of the present invention. In such an embodiment, the first side support 30 and second side support 36 will each be rotatably connected directly to the mount assembly 40.

In a preferred embodiment, the mount assembly 40 will extend vertically upward from the rear support 21 such that the rear support 21 is positioned near ground level when the lift member 14 to which the mount assembly 40 is removably attached is in a lowered position.

The mount assembly 40 may include a pair of cross bars 42, 44 which extend from the mount assembly 40 to a point on the central rod 50 of the present invention. The cross bars 42, 44 act to provide additional structural support for the frame 20 and central rod 50. In a preferred embodiment, a first cross bar 42 will extend from a first end 43 of the mount assembly 40 and a second cross bar 44 will extend from a second end 45 of the mount assembly 40 to a common point on the central rod 50 in a substantially triangular configuration as shown in FIG. 1. The cross bars 42, 44 will preferably be fixedly attached to a point on the central rod 50 between its intersection with the first leveling member 60 and second leveling member 65 of the present invention.

The mount assembly 40 may also include a pair of connectors 46, 48 positioned thereon. The pair of connectors 46, 48 will generally be included to provide attachment points for the connection members 72, 76 of the present invention. The connectors 46, 48 may be comprised of various configurations but are preferably comprised of rings as shown in FIG. 1.

The connectors 46, 48 may be positioned at various locations on the mount assembly 40. In a preferred embodiment as shown in FIG. 4, a first connector 46 will be fixedly attached to a first end 43 of the mount assembly 40 and a second connector 48 will be fixedly attached to a second end 45 of the mount assembly 40.

D. Central Rod.

The land leveling device 10 will generally include a central rod 50 extending from the rear support 21 in a forward direction substantially parallel with both the first side support 30 and second side support 36. The central rod 50 may be connected at various points on the rear support 21, but will preferably be connected to the approximate center point on the rear support 21 between its first end 22 and second end 23 as shown in FIG. 4. It is also appreciated that, in some embodiments, the central rod 50 may be integrally formed with the rear support 21.

Each of the leveling members 60, 65 will generally be pivotably attached to the central rod 50 via a pair of pivot members 52, 54 as shown in FIG. 4. The pivot members 52, 54 may be comprised of various configurations which allow a pivotal connection between the leveling members 60, 65 and the central rod 50. Generally, each of the pivot members 52, 54 will be fixedly attached to the top surface of a leveling member 60, 65 and be rotatably connected around the central rod 50. In a preferred embodiment, the pivot members 52, 54 will be comprised of substantially cylindrical members which extend around the central rod 50 and are fixedly attached to the leveling members 60, 65. It is also appreciated that, in some embodiments, a locking mechanism may be provided for the pivot members 52, 54 of the present invention to prevent pivoting of the leveling members 60, 65 when such movement is undesirable.

The pivot points 52, 54 may be positioned at various locations on the central rod 50, but in a preferred embodiment a first pivot member 52 will be positioned adjacent the forward-facing end of the central rod 50 at its intersection with the first leveling member 60. A second pivot member 54 will be positioned approximately halfway between the rear support 21 and the first leveling member 60.

It is also appreciated that different embodiments of the land leveling device 10 may utilized varying numbers of pivot members 52, 54. There will generally be one pivot member 52, 54 for each leveling member 60, 65 to ensure that the leveling member 60, 65 may freely pivot so as to allow the present invention to smooth out uneven surfaces. For example, in an embodiment of the present invention which utilizes three leveling members 60, 65, there would be three pivot members 52, 54 included.

E. Leveling Members.

The present invention will generally include at least one leveling member 60, 65 for passes over and smoothing out terrain when the present invention is in use. The leveling members 60, 65 of the present invention will generally be comprised of elongated members which extend from the first side support 30 to the second side support 36 perpendicular to the central rod 50. The leveling members 60, 65 may be comprised of various configurations which act to smooth terrain surfaces, but will preferably include a flat, substantially rectangular lower surface for sifting dirt, removing debris and smoothing out any area over which they pass as shown in FIG. 3a.

Various configurations of leveling members 60, 65 may be utilized, including embodiments having a single leveling member 60 or embodiments which include multiple leveling members 60, 65 positioned between the side supports 30, 36 at points along the length of the side supports 30, 36 extending from the rear support 21. One such embodiment is shown in FIG. 4 as including a first leveling member 60 and a second leveling member 65. The first leveling member 60 is rotatably attached at its first end 61 to to a point adjacent the second end 32 of the first side support 30 and at its second end 62 to a point adjacent the second end 38 of the second side support 36. The second leveling member 65 is rotatably attached at its first end 66 to the first side support 30 at a point between the first side support's 30 respective ends 31, 32 and at its second end 67 to the second side support 36 at a point between the second side support's 36 respective ends 37, 38.

The leveling members 60, 65 will generally be positioned perpendicularly with respect to the central rod 50 and will preferably be pivotally attached to the central rod 50 at their respective central points by the first pivot member 52 and second pivot member 54 as shown in FIG. 4. The first leveling member 60 will generally be fixedly attached to the bottom surface of the first pivot member 52 and the second leveling member 65 will generally be fixedly attached to the bottom surface of the second pivot member 54, wherein the pivot members 52, 54 are each rotatably connected around the central rod 50. By configuring the leveling members 60, 65 as such, they will be adapted to pivot about the central rod 50 when passing over surfaces, and thus prevent from becoming dug into dirt or other debris when the land leveling device 10 attempts to level a graded or uneven surface.

Each of the leveling members 60, 65 will generally be fixedly attached to a pair of joints 63, 64, 68, 69 which extend rotatably through the apertures 33, 39 of the side supports 30, 36 as shown in FIG. 4. The joints 63, 64, 68, 69 of the present invention may be comprised of any joint, socket or other structure which allows a rotatable connection between the leveling members 60, 65 and the side supports 30, 36 such that the side supports 30, 36 rotate with respect to the leveling members 60, 65. In a preferred embodiment, the joints 63, 64, 68, 69 of the present invention are comprised of ball joints.

In a preferred embodiment, the first leveling member 60 will include a first joint 63 fixedly attached to its first end 61 and a second joint 64 fixedly attached to its second end 62. The first joint 63 of the first leveling member 60 will rotatably extend through an aperture 33" adjacent the second end 32 of the first side support 30. The second joint 64 of the first leveling member 60 will rotatably extend through an aperture 39" adjacent the second end 38 of the second side support 36.

In such a preferred embodiment, the second leveling member 65 will similarly include a first joint 68 fixedly attached to its first end 66 and a second joint 69 fixedly attached to its second end 67. The first joint 68 of the second leveling member 65 will rotatably extend through an aperture 33' positioned at a point between the first end 31 of the first side support 30. The second joint 69 of the second leveling member 65 will rotatably extend through an aperture 39' positioned at a point between the first end 37 and second end 38 of the second side support 36.

F. Bias Members.

Due to the rotational connection between the rear support 21 and the side supports 30, 36, the side supports 30, 36 will generally freely rotate about the rear support 21 in a downward direction when the lift member 14 to which the mount assembly 40 is attached is in a lifted position. To prevent damage from such motions, a connection between the mount assembly 40 and the frame 20 is preferable to suspend the frame 20 in a raised positioned when the lift member 14 is raised. The connection will also act to maintain the leveling members 60, 65 at a level, non-pivoted position when not in use.

When the lift member 14 of a tractor 12 to which the present invention is mounted is in a raised positioned, the frame 20 will be suspended above the ground by the bias members 70, 74 and connection members 72, 76. In a preferred embodiment as shown in the figures, a pair of bias members 70, 74 and connection members 72, 76 may be utilized to connect the mount assembly 40 to the frame 20. Although various configurations may be utilized, it is preferable to use bias members 70, 74 comprised of springs and connection members 72, 76 comprised of chains.

In a preferred embodiment, a first bias member 70 may be attached at its first end to the first connector 46 of the mount assembly 40 and at its second end to the first end of a first connection member 72. The second end of the first connection member 72 will generally be attached to a first connector 78 positioned on the first side support 30. The first connector 78 may be comprised of various configurations and located at various points on the first side support 30, but will preferably be comprised of a ring fixedly attached to a point near the second end 32 of the first side support 30.

Similarly, a second bias member 74 may be attached at its first end to the second connector 48 of the mount assembly 40 and at its second end to the first end of a second connection member 76. The second end of the second connection member 76 will generally be attached to a second connector 79 positioned on the second side support 36. The second connector 79 may be comprised of various configurations and located at various points along the second side support 36, but will preferably be comprised of a ring fixedly attached to a point near the second end 38 of the second side support 36.

G. Operation of Preferred Embodiment.

In use, the land leveling device 10 is first attached to the lift member 14 of a tractor 12 through use of the mount assembly 40. After attaching the land leveling device 10 to the front of a tractor 12, the lift member 14 may be placed into a raised positioned to lift up the frame 20 and leveling members 60, 65 into a raised position while the tractor 12 is directed to an area to be leveled. While in a raised positioned, the side supports 30, 36 will be maintained in a suspended state through use of the bias members 70, 74 and connection members 72, 76.

Upon reaching the area to be leveled, the lift member 14 of the tractor 12 may be placed into a lowered positioned until the leveling members 60, 65 of the present invention rest upon the ground to be leveled. The tractor 12 may then be advanced, running the flat bottom surfaces of the leveling members 60, 65 over any surfaces to be smoothed and/or cleared of debris. Upon encountering a graded surface or large mound of dirt, the leveling members 60, 65 will freely pivot about the central rod 50 to accommodate and prevent problems. The first side support 30 and second side support 36 will each rotate with respect to the rear support 21 so as to provide similar protection against problems created by leveling uneven surfaces. In such a manner, the land leveling device 10 is capable of traversing uneven surfaces with obstacles such as dirt mounds and the like without becoming caught up or requiring constant use of reverse to clear jams or obstructions.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A land leveling device, comprising:
   a frame adapted to be removably attachable to a tractor, wherein said frame includes a rear support, a first side support and a second side support, wherein said first side support extends from a first end of said rear support, wherein said second side support extends from a second end of said rear support, wherein said first side support and said second side support extend perpendicularly with respect to said rear support;
   a central rod extending from said rear support, wherein said central rod extends perpendicular to said rear support, wherein said central rod is positioned between said first side support and said second side support;
   a first leveling member extending from said first side support to said second side support, wherein said first leveling member is pivotally connected to said central rod such that said first leveling member pivots about said central rod; and
   a second leveling member extending from said first side support to said second side support, wherein said second leveling member is pivotally connected to said central rod such that said second leveling member pivots about said central rod, wherein a first end of said first side support is rotatable connected to said first end of said rear support, wherein a first end of said second side support is rotatably connected to said second end of said rear support.

2. The land leveling device of claim 1, further comprising a first ball joint connecting said first end of said first side support to said first end of said rear support and a second ball joint connecting said first end of said second side support to said second end of said rear support.

3. The land leveling device of claim 1, wherein a first end of said first leveling member is rotatably connected to a second end of said first side support, wherein a second end of said first leveling member is rotatably connected to a second end of said second side support.

4. The land leveling device of claim 3, further comprising a first ball joint connecting said first end of said first leveling member to said second end of said first side support and a second ball joint connecting said second end of said first leveling member to said second end of said second side support.

5. The land leveling device of claim 3, wherein a first end of said second leveling member is rotatably connected to said first side support, wherein a second end of said second leveling member is rotatably connected to said second side support.

6. The land leveling device of claim 5, further comprising a first ball joint connecting said second leveling member to said first side support and a second ball joint connecting said second leveling member to said second side support.

7. The land leveling device of claim 1, further comprising a first pivot member rotatably extending around said central rod, wherein said first pivot member is fixedly attached to said first leveling member.

8. The land leveling device of claim 7, further comprising a second pivot member rotatably extending around said central rod, wherein said second pivot member is fixedly attached to said second leveling member.

9. A land leveling device, comprising:
   a frame adapted to be removably attached to a tractor, wherein said frame includes a rear support, a first side support and a second side support, wherein said first side support extends from a first end of said rear support, wherein said second side support extends from a second end of said rear support, wherein said first side support and said second support extend perpendicularly with respect to said rear support, wherein a first end of said first side support is rotatably connected to said first end of said rear support, wherein a first end of said second side support is rotatably connected to said second end of said rear support;
   a first ball joint connecting said first end of said first side support to said first end of said rear support;
   a second ball joint connecting said first end of said second side support to said second end of said rear support;

a central rod extending from said rear support, wherein said central rod extends perpendicular to said rear support, wherein said central rod is positioned between said first side support and said second side support;

a mount assembly connected to said rear support for removably attaching to a lift member of said tractor;

a first cross bar linking said mount assembly with said central rod;

a second cross bar linking said mount assembly with said central rod;

a first leveling member extending from said first side support to said second side support, wherein said first leveling member is pivotally connected to said central rod such that said first leveling member pivots about said central rod, wherein a first end of said first leveling member is rotatably connected to a second end of said first side support, wherein a second end of said first leveling member is rotatably connected to a second end of said second side support;

a third ball joint connecting said first end of said first leveling member to said second end of said first side support;

a fourth ball joint connecting said second end of said first leveling member to said second end of said second side support;

a second leveling member extending from said first side support to said second side support, wherein said second leveling member is pivotally connected to said central rod such that said first second member pivots about said central rod, wherein a first end of said second leveling member is rotatably connected to said first side support, wherein a second end of said second leveling member is rotatably connected to said second side support;

a fifth ball joint connecting said first end of said second leveling member to said first side support;

a sixth ball joint connecting said second end of said second leveling member to said second side support;

a first pivot member rotatably extending around said central rod, wherein said first pivot member is fixedly attached to said first leveling member; and a second pivot member rotatably extending around said central rod, wherein said second pivot member is fixedly attached to said second leveling member.

* * * * *